United States Patent [19]

Inagaki

[11] Patent Number: 4,514,218
[45] Date of Patent: Apr. 30, 1985

[54] REDUCED IRON MELTING METHOD USING ELECTRIC ARC FURNACE

[75] Inventor: Etsuo Inagaki, Nagoya, Japan

[73] Assignee: Daidotokushuko Kabushikikaisha, Japan

[21] Appl. No.: 617,778

[22] Filed: Jun. 6, 1984

[51] Int. Cl.³ .............................................. C21C 5/52
[52] U.S. Cl. ...................................... 75/12; 75/10 R; 75/11
[58] Field of Search ........................................ 75/10-12

[56] References Cited

U.S. PATENT DOCUMENTS 4,246,023 1/1981 Savov .................................... 75/12
4,252,559 2/1981 Allain .................................... 75/11

Primary Examiner—Peter D. Rosenberg
Attorney, Agent, or Firm—William A. Drucker

[57] ABSTRACT

Molten metal is pooled at the bottom of an electric arc furnace and a layer of slag is formed overlying the molten metal. Electric arcs are formed between the electrodes and molten metal, the arcs piercing through the slag layer to heat the molten metal and slag. Under this condition, reduced iron is charged into the slag layer, melted by the heat of slag and separated into slag component and iron component. The slag component is absorbed into the surrounding slag layer while the iron component passes through the slag layer and mixes in the molten metal. In case the temperatures of slag and molten metal have deviated from the setting values, the input power to the electrodes and the length of arcs formed between the electrodes and molten metal are so adjusted that the setting temperatures are restored.

1 Claim, 5 Drawing Figures

REDUCED IRON MELTING METHOD USING ELECTRIC ARC FURNACE

BACKGROUND OF THE INVENTION

1. Field of the Invention

This invention relates to a method for melting reduced iron by using an electric arc furnace for producing molten metal from said reduced iron. More particularly, the present invention relates to a method for controlling the electric arc furnace in the process of melting said reduced iron.

2. Description of the Prior Art

When reduced iron is melted for producing molten iron by using an electric arc furnace, molten metal is accumulated at the furnace bottom and a slag layer overlies the molten metal. Granular reduced iron is charged successively onto the slag layer in the furnace and passes downwardly through said slag layer. In the course of this passage, reduced iron is melted by the heat of slag and decomposed into slag component and iron component. The slag component mingles into the surrounding slag layer while the iron component passes through the slag layer and mixes in the molten metal.

In said processing of reduced iron, it is important to maintain the temperature of said molten metal layer substantially constant for the following reasons:

(a) If the molten metal temperature is too low, the molten metal is unable to maintain its intrinsic nature, that is, it cannot maintain the molten state and is solidified.

(b) A too high molten metal temperature leads to a damage of the furnace and an energy loss.

It is also imperative to keep the slag temperature substantially constant for the following reasons:

(c) If the slag temperature is too low, the reduced iron melting capacity of the slag is reduced, allowing the reduced iron to be directly (in a non-molten state) charged into the high-temperature molten metal. As a consequence, carbon and oxygen contained in the reduced iron are abruptly reacted and expanded (CO boiling) in the high-temperature molten metal, causing a danger of explosion.

(d) A too high slag temperature not only leads to an excess increase of energy loss but also accelerates the damage to the furnace.

For three reasons, it is essential to maintain the temperatures of said molten metal and slag layer at the optimal levels. Actually, however, the molten metal and slag temperatures are widely variable according to the change of supply voltage, the change of ambient temperature, the change of temperature of the atmosphere in the furnace due to dust collection in the furnace, and other various factors. Hitherto, control of said temperatures has been made by adjusting the input power to the electric arc furnace or by adjusting the arc length. According to such methods, however, when it is tried to regulate the temperature of one of them, molten metal or slag, the temperature of the other is caused to change accordingly. That is, when one of them is adjusted to a proper temperature, the other is departed from its optimal temperature range.

SUMMARY OF THE INVENTION

It is therefore an object of this invention to provide a method by which it is possible to continuously charge the reduced iron into an electric arc furnace and to let the charged reduced iron melt successively in the furnace so that the amount of molten metal in the furnace is steadily increased.

Another object of this invention is to provide a method according to which when reduced iron is melted in said way, even if slag temperature and molten metal temperature should change individually, it is possible to correct the respective temperatures independently, that is, to correct the temperature of one matter (molten metal or slag) without affecting the temperature of the other matter.

According to the method of this invention, it is possible to maintain the slag temperature at the optimal level. This makes it possible to melt the charged reduced iron infallibly and to minimize the damage to the electric arc furnace by the slag.

Also, according to the method of this invention, it is possible to maintain the molten metal temperature constant at the optimal level. This enables the maintenance of molten metal in a proper molten state and the minimization of damage to the electric arc furnace by molten metal and energy loss.

Other objects and advantages of the invention will become apparent during the following discussion of the accompanying drawings.

DESCRIPTION OF THE PREFERRED EMBODIMENTS

Figure 1:
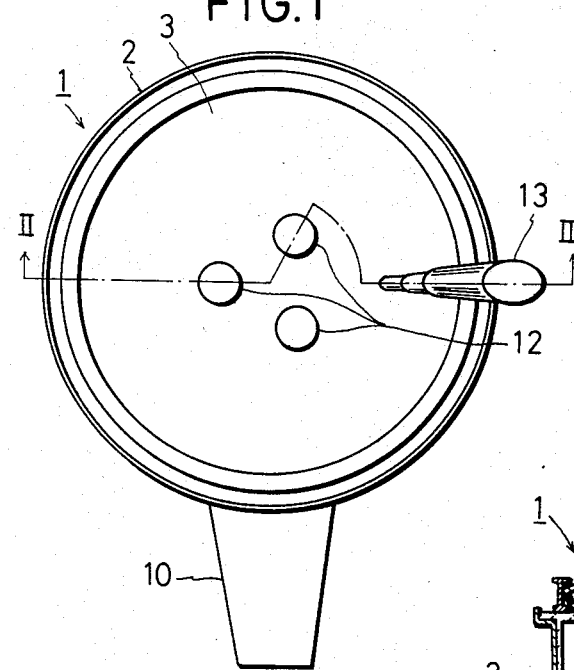
FIG. 1 is a top plan view of an electric arc furnace.
Figure 2:
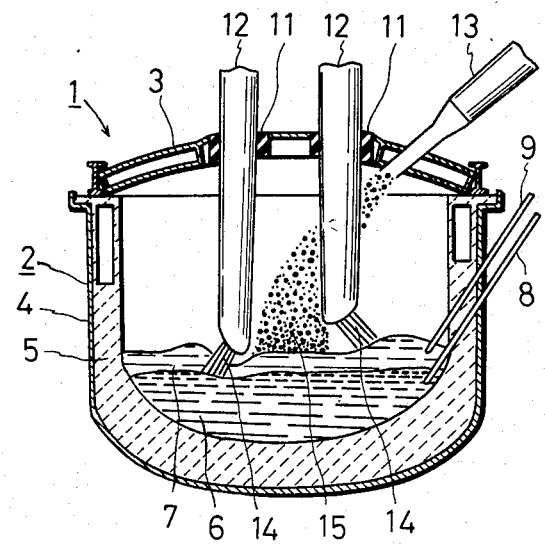
FIG. 2 is a sectional view taken along the line II—II of FIG. 1.
Figure 3:
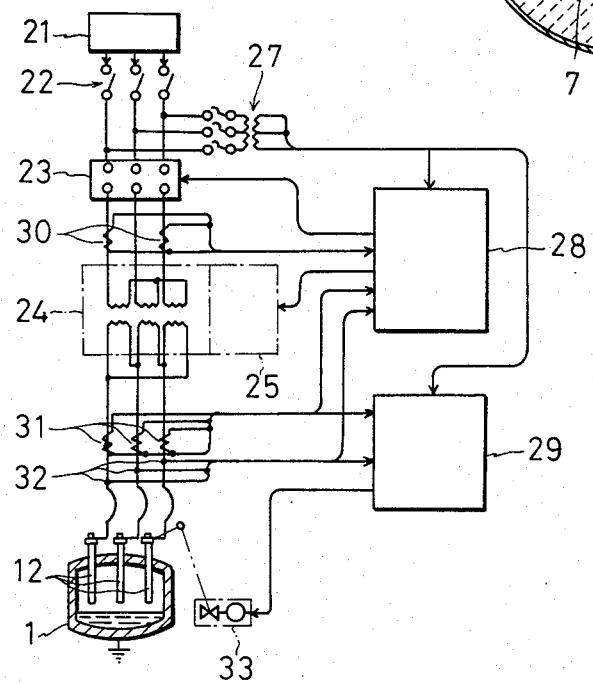
FIG. 3 is a diagram showing the power supply system to the electric arc furnace and the furnace control system.

Referring to FIGS. 1 and 2, an electric arc furnace 1 comprises a concave furnace body 2 and a furnace roof 3 covering the top opening of the furnace body 2. As is generally known, the furnace body 2 consists of a furnace shell 4 made of steel or other material and a refractory lining 5. In the furnace body 2 in operation, molten metal 6 and slag 7 are accumulated, with the slag overlying the molten metal as shown in FIG. 2. A molten metal temperature detector 8 and a slag temperature detector 9 are provided in the furnace body 2. A thermocouple may be used for these detectors 8, 9. The furnace body 2 is also provided with a tapping spout 10 for effluxing the molten metal 6 in a known way. The furnace roof 3 is made of steel and so constructed that it is cooled with water. The underside of said furnace roof 3 may be lined with a refractory material. At the center of said furnace roof 3 are provided the arc-generating electrodes each with the medium of an annular insulator 11. Each electrode 12 is so designed that it can be moved vertically by an electrode positioning device 33 as shown in FIG. 3. In FIG. 2, the left-side electrode 12 is shown in its lowered position while the right-side electrode is shown slightly raised up. Through the furnace roof 3 is provided a charging shoot 13 for charging reduced iron into the furnace. This charging shoot 13 is so designed that reduced iron will be charged in to the central zone in the inside space of the furnace body 2.

Referring now to FIG. 3, there are shown the power supply system to th electric arc furnace 1 and its control system. According to this power supply system, the power from a high-voltage power source 21 is led to the primary side of a furnace transformer 24 via a disconnecting switch 22 and a circuit breaker 23. The furnace transformer 24 is provided with a tap changer 25 to allow control of its secondary side output. The secondary side output of the furnace transformer 24 is supplied to the electrodes 12 in the electric arc furnace 1. On the other hand, a part of power which has passed the disconnecting switch 22 is supplied through a potential transformer 27 to an arc furnace control device 28 and an automatic electrode controller 29 to actuate them. To the arc furnace control device are input the measured values of current by the current transformers 30, 31 on the primary and secondary sides, respectively, of the furnace transformer 24 and the measured values of voltage from the voltage measuring points 32. Also, the control device 28 operates the tap changer 25 according to the measured values so that a preset power will be supplied to the electrodes 12 of the arc furnace 1. Further, the control device 28 operates to disconnect the circuit breaker 23 at emergency. On the other hand, to the automatic electrode controller 29 are input the measured values of current from the transformers 31 and the measured values of voltage from the voltage measuring points 32. The controller 29 operates to control the electrode positioning device 33 according to the measured values so that a desired arc length is provided in the furnace. The electrodes 12 are thereby positioned at a height where the desired arc length is provided.

Now, the operation of the electric arc furnace 1 illustrated in FIGS. 1 and 2 will be discussed. First, an initial charge is made into the furnace body 2. For this initial charge, steel scrap or a mixture of steel scrap and reduced iron is used because reduced iron alone is insufficient to effect desired melting. The amount of this initial charge is usually about 20% of the full loads of the furnace body 2, that is, it is about 20 tons in the case of a 100 ton-capacity furnace. In case steel scrap alone is used for said initial charge, batch charging is recommended as in the ordinary steel making processes. In case of using a mixture of steel scrap and reduced iron, it is advised to use a method by which the charged material mounts up in the center of the furnace bottom so that the charged material will not adhere to the inside wall surface of the furnace body 2. After the initial charge has been made, the furnace roof 3 is mounted and an electric power is supplied to the electrodes 12 to generate arcs between said electrodes and charged material to cause melting of the charged steel scrap or mixture of steel scrap and reduced iron. Instead of the initial charging, there may be employed a method in which a small quantity of molten metal left over from the previous run of operation remains at the bottom of the furnace body 2.

When the initially charged material is melted, molten metal 6 is pooled at the bottom of the furnace body 2 and a layer of slag 7 is formed overlying the molten metal. Under this condition, the power supply to the electrodes 12 is continued to let the arcs 14 form lastingly between the electrodes 12 and molten metal 6 so that the arcs pierce through the slag layer 7 while reduced iron 15 is continuously charged from the charging shoot 13 as shown in FIG. 2. Reduced iron 15 charged into the furnace is usually in the form of pellets, small lamps or briquets.

Reduced iron 15 charged from the charging shoot 13 first enters the layer of slag 7 in which said reduced iron 15 is melted and separated into iron component and slag component. The iron component, because of its large specific gravity, descends through the slag layer and mixes in molten metal 6. The slag component mingles into the surrounding slag layer 7.

In the state where charging of reduced iron and its melting are performed continuously in the manner described above, that is, in the steady state of operation of the furnace, the specific gravity of molten metal 6 is about 7 to 7.5 and its temperature is around 1,580° C. while the specific gravity of slag 7 is 1.5 to 3 (2.5 to 3 when charging of reduced iron is stopped) and its temperature is around 1,600° C. Said temperature of molten metal 6 is set within a range from a low temperature (of around 1,550° C.) at which molten metal is kept molten (not solidified) and can be immediately utilized to a high temperature (of around 1,650° C.) which causes no excess loss of heat energy nor any excess damage to the inside wall surface of the furnace body 2. Also, the slag temperature is set within a range from a low temperature (of around 1,580° C.) at which the reduced iron melting capacity is not lowered to a high temperature (of around 1,680° C.) which causes no excess loss of heat energy nor excess damage to the inside wall surface of the furnace body 2. The slag temperature is variable depending on the slag composition.

Figure 4:
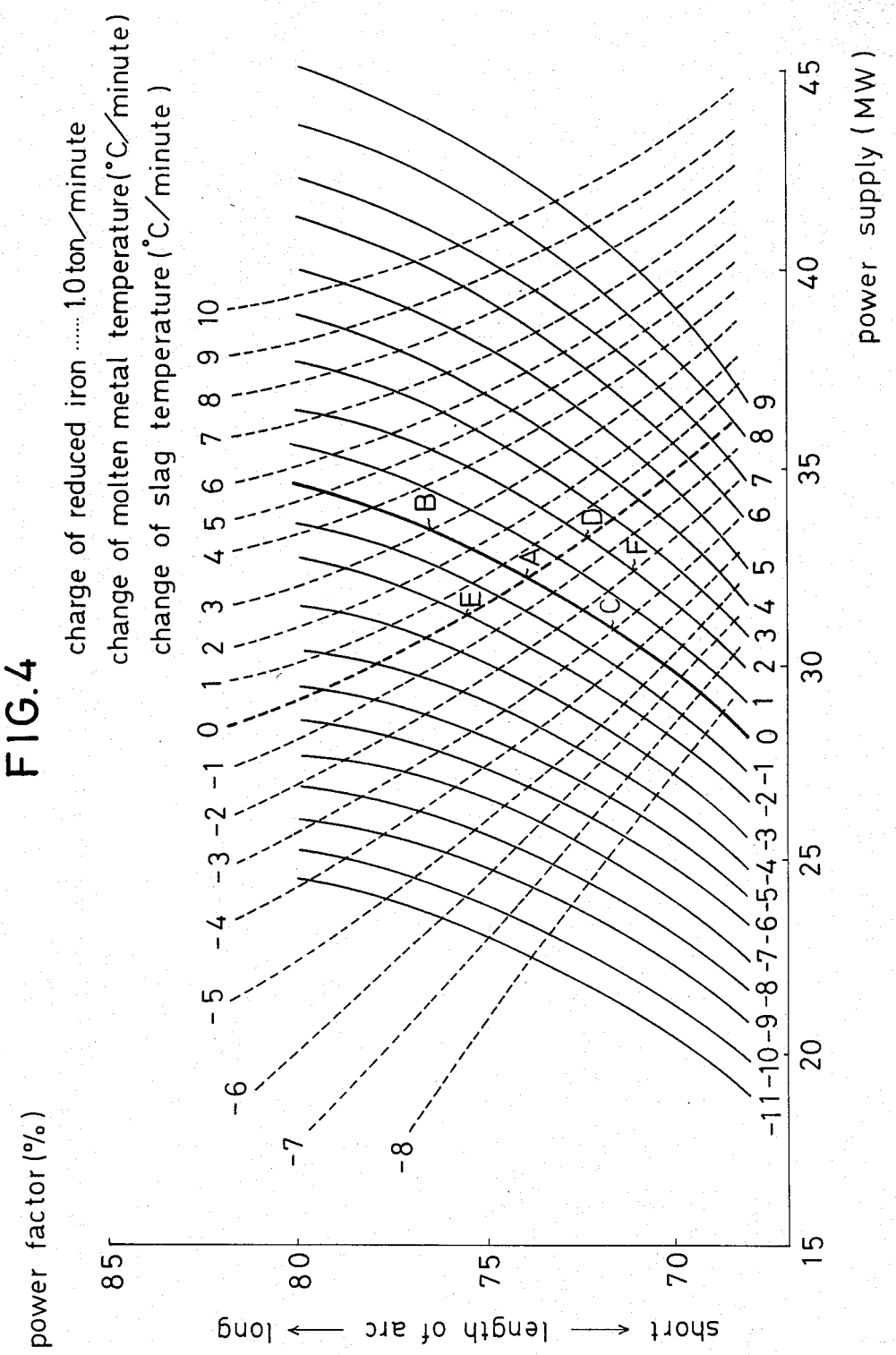
FIG. 4 is a graph showing the relation between the power supply to the arc furnace and power factor and the change of molten metal and slag temperatures when the charge of reduced iron into the furnace per unit time is set at a fixed rate.

The change of temperature of molten metal 6 and slag 7 in said operating condition is made in the following way: the input voltage to the electrodes 12 is changed (this operation is made, for example, by the control device 28); or the length of arcs formed between the lower ends of electrodes 12 and the molten metal 6 is changed by raising or lowering the electrodes 12 (by, for instance, operating the automatic electrode controller 29). These operations will be explained below with reference to FIG. 4. FIG. 4 is a graph showing the relation between the input power to the electrodes 12 and arc length and the change of temperature of molten metal 6 and slag 7 in the electric arc furnace where reduced iron 15 is charged at a rate of 1 ton/min. Since the arcs 14 are generated in the inside of the furnace, it is difficult to measure their length with the eye. Therefore, the power factor which has a fixed relation with the arc length (the power factor of the electric power supplied to the electrodes 12) is usually used as a measure of the arc length, and in accordance with this, the value of such power factor is given along the vertical axis in the graph of FIG. 4. (The relation between arc length and power factor is such that the greater the arc length, the higher becomes the power factor).

(1) In case the charging and melting of reduced iron 15 are conducted steadily in the electric arc furnace 1 and the temperatures of molten metal 6 and slag 7 are maintained at the predetermined levels, respectively, the relation between input power and power factor is represented by the corssing point (A) of the curve of temperature change of 0° C./min of molten metal and the curve of temperature change of 0° C./min of slag.

(2) In case it is desired to elevate the slag temperature alone as for instance when a drop of slag temperature below the predetermined level was detected by the slag temperature detector 9, the input power is increased and the arc length is enlarged. For instance, when it is desired to elevate the slag temperature at a rate of 3° C./min, both input power and power factor are elevated from the values at the point (A) to the values at the point (B). This operation is done, for instance, by setting the input power at point (B) in the furnace control device 28 while setting the power factor (arc length) at point (B) in the electrode controller 29. As a result of such operation, the tap changer 25 of the transformer 24 is controlled by the device 28 and the input power to the electrodes 12 is regulated to the value at point (B), while the electrodes 12 are controlled by the device 33 to regulate the power factor (arc length) to the value at point (B). (In this situation, the electrodes 12 are raised up like the one shown on the right side in FIG. 2, and the arcs 14 formed between said electrodes 12 and molten metal 6 are accordingly elongated). As the furnace operation is continued in this state, the slag temperature alone rises up with the temperature of molten metal 6 remaining unchanged. When the rise of slag temperature to the predetermined level was detected by the slag temperature detector 9, both input power and power factor are brought back to the values at point (A). Thenceforth, both molten metal 6 and slag 7 can be maintained at said predetermined temperatures.

(3) In case it is desired to lower the slag temperature alone as for instance when the rise of slag temperature above the predetermined level was detected by the slag temperature detector 9, the input power is reduced and the arc length is shortend. That is, both input power and power factor are reduced, for instance, to the values at point (C) in FIG. 4 by operating the respective control devices 28 and 29. The ensuing operation is same as in the above-said case (2).

(4) When it needs to elevate the molten metal temperature alone as for instance when a drop of molten metal temperature below the predetermined level has been detected by the molten metal temperature detector 8, the input power is increased and the arc length is reduced. For instance, when it is desired to elevate the temperature of molten metal 6 at a rate of 2° C./min, the input power to the electrodes and the power factor are adjusted to the values at point (D) by operating the controlling devices 28 and 29. By continuing the furnace operation in this state, the molten metal temperature alone is allowed to rise at a rate of 2° C./min. And when the rise of molten metal temperature to the predetermined level has been detected by the molten metal temperature detector 8, both input power and power factor are brought back to the values at point (A). Thencefore, both molten metal 6 and slag 7 can be maintained at their predetermined temperatures.

(5) For lowering the molten metal temperature alone as for instance when a rise of molten metal temperature above the predetermined level was detected by the molten metal temperature detector 8, the input power is reduced and the arc length is elongated. That is, input power and power factor are adjusted to the values at point (E) by operating the controlling devices 28, 29. The rest of the process is same as in the above-said case (4).

Described above are the cases where the temperature change of slag or molten metal is made individually. However, the temperatures of both slag and molten metal may be changed simultaneously in accordance with the pattern of temperature change required of both slag and molten metal (for instance in case one of them is lowered and the other is elevated in temperature, or in case both are elevated in temperature at the respective predetermined rates of temperature change). For example, when it is desired to elevate the molten metal temperature at a rate of 2° C./min while reducing the slag temperature at the same rate, the input power to the electrodes and the power factor are adjusted to the values at point (F) by operating the devices 28, 29. If the furnace operation is continued in this state, the temperatures of both molten metal and slag change at said rate.

Figure 5:
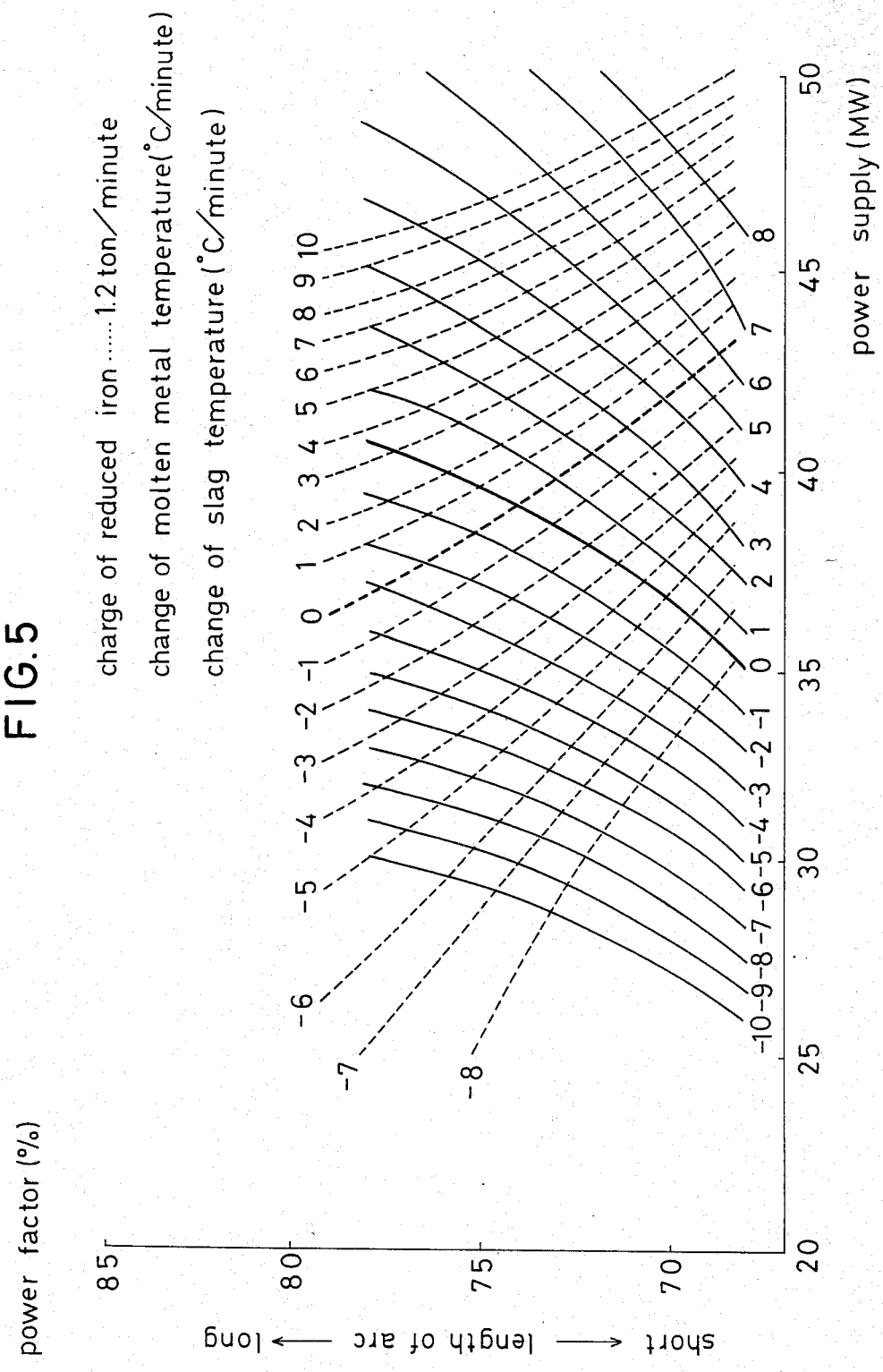
FIG. 5 is a graph showing the similar relation to that shown in FIG. 4 when the charge of reduced iron per unit time is set at a different rate that in the case of FIG. 4.

In the event the charge (per unit time) of reduced iron to the electric arc furnace 1 changes, the temperatures of slag 7 and molten metal 6 deviate from the predetermined values if the operation is carried on with the same input power and same arc length as used thitherto. In such a case, in order to correct the temperature deviation and restore the original temperature levels, one may carry out the same operation as said above but in conformity to the regulated relation between the input power and arc length and the temperature change of molten metal and slag in the event of a variation of reduced iron charge (for example, according to the graph of FIG. 5 showing said relation in case the charge of reduced iron is 1.2 ton/min).

The above operation is preferably conducted automatically by a control system. In such a case, the relation such as shown in FIG. 4 or FIG. 5 is previously calculated according to the various rating standards of the electric arc furnace used or determined experimentally, and such relation is stored in a computer or other control devices. Thus, the operation is conducted by automatically controlling the furnace controlling device 28 or automatic electrode controller 29 by the control devices in accordance with the temperatures detected by the temperature detectors 8, 9. The above operation, however, can be performed manually. In this case, too, the above-said relation needs to be determined previously as in the case of automatic control. In operation, the temperatures of molten metal 6 and slag 7 are detected by the respective temperature detectors 8, 9, and if any of the measured values deviates from the predetermined level, the degree of deviation is collated with said relation and proper adjustment of input power or adjustment of arc length (ascent or descent of the electrodes 12) is made manually.

As many apparently widely different embodiments of this invention may be made without departing from the spirit and scope thereof, it is to be understood that the invention is not limited to the specific embodiments thereof as defined in the appended claims.

What is claimed is:

1. A process for melting reduced iron by using an electric arc furnace having a space for melting in its inside and verically movable electrodes in the upper part, the process comprising the following steps (a) to (c):
    (a) forming a pool of molten metal at the bottom of the melting space of the furnace while forming a layer of slag overlying said molten metal;
    (b) continuously charging reduced iron and melting the charged reduced iron; and
    (c) feeding electric power to said electrodes to form arcs between the electrodes and molten metal, said arcs piercing through said slag layer, to make up for the drop of temperature of slag and molten metal caused by melting of said charged reduced iron, said process being further characterized by incorporating the following steps (d) to (h):
    (d) detecting the temperature change of said molten metal and the temperature change of slag;

(e) increasing the input power to said electrodes and elongating the arc length by lifting up the electrodes to increase the slag temperature while maintaining the molten metal temperature constant in case the slag temperature has dropped;

(f) decreasing the input power to the electrodes and shortening the arc length by lowering the electrodes to reduce slag temperature alone while maintaining the molten metal temperature unchanged in case the slag temperature has risen;

(g) increasing the input power to the electrodes and shortening the arc length by lowering the electrodes to elevate the molten metal temperature alone while maintaining the slag temperature unchanged in case the molten metal temperature has dropped; and (h) decreasing the input power to the electrodes and elongating the arc length by lifting up the electrodes to reduce molten metal temperature alone while maintaining the slag temperature unchanged in case the molten metal temperature has arisen.

* * * * *